UNITED STATES PATENT OFFICE.

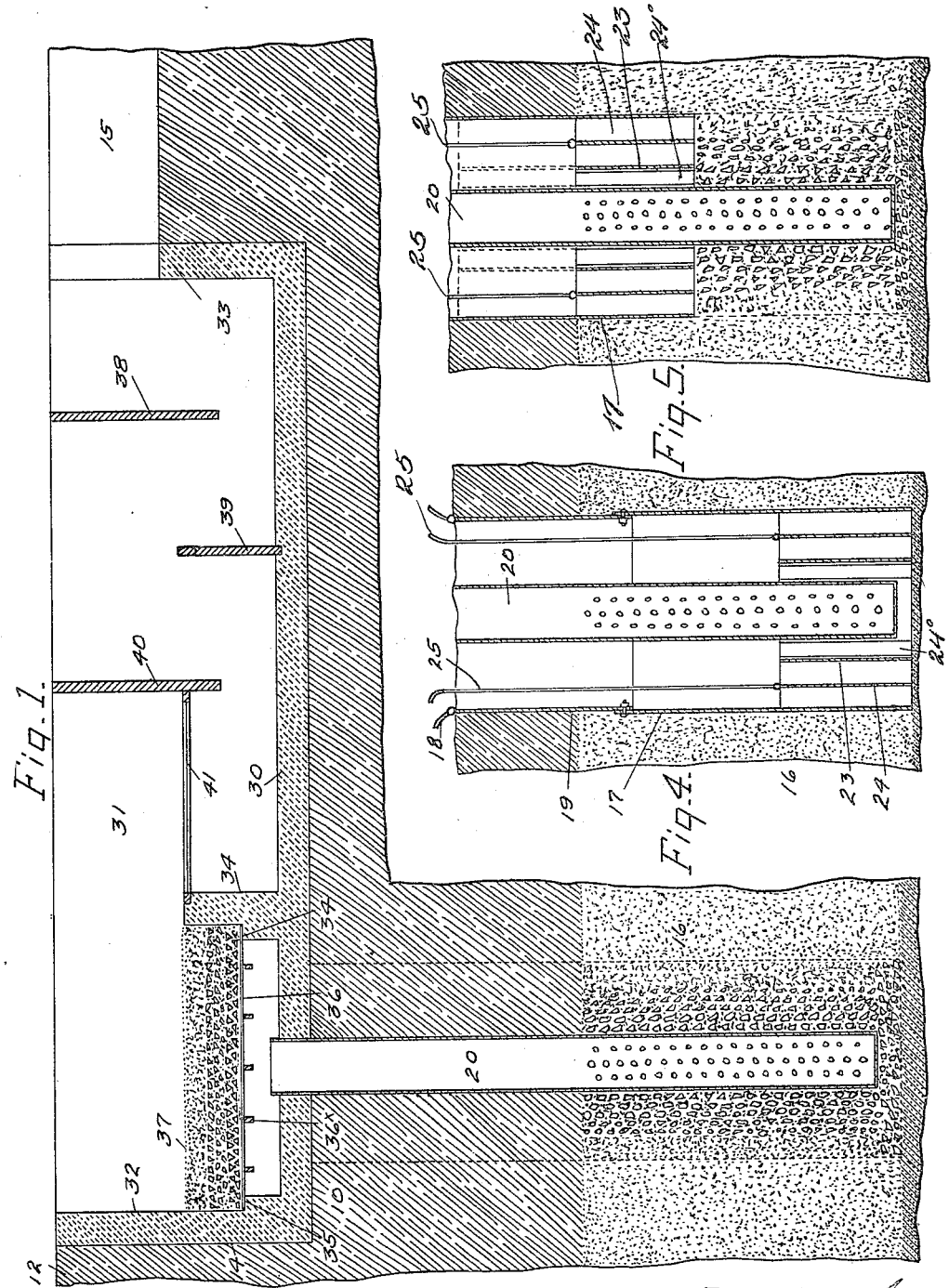

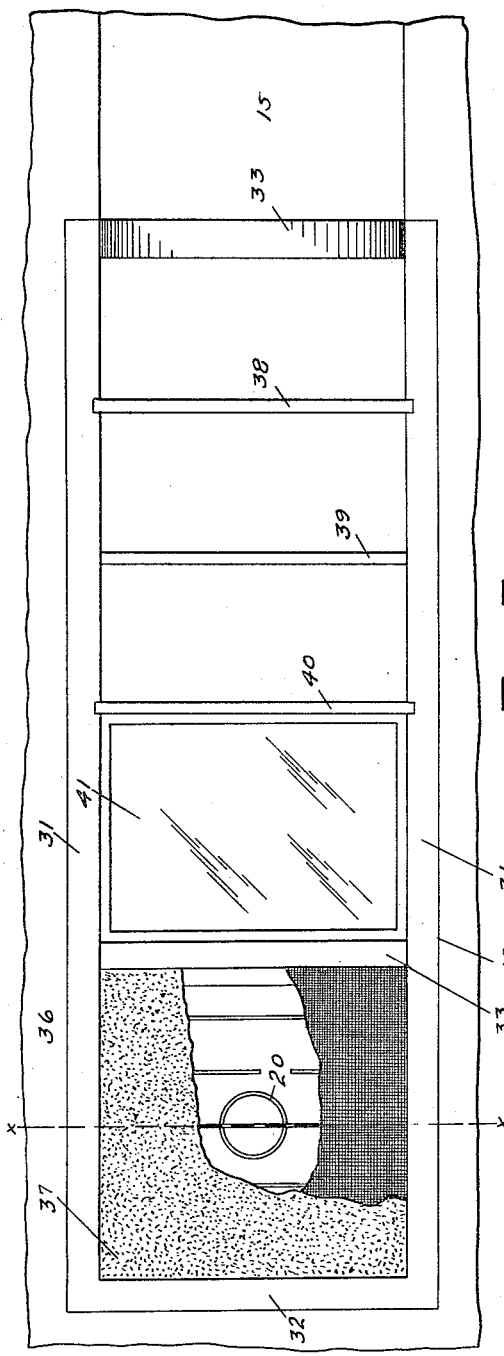
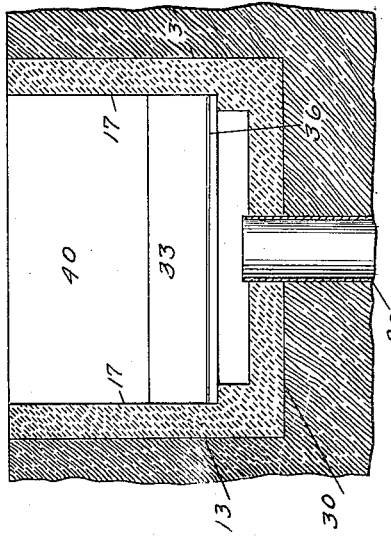
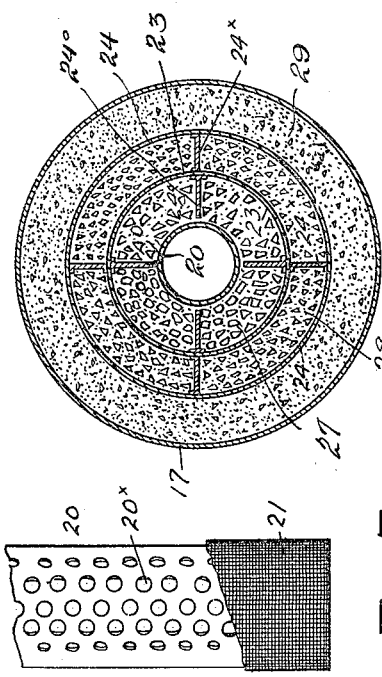

EPHRAIM C. SOOY, OF KANSAS CITY, MISSOURI.

SYSTEM AND APPARATUS FOR THE DRAINAGE AND RECLAMATION OF INUNDATED SURFACES OF LAND.

1,142,125. Specification of Letters Patent. Patented June 8, 1915.

Application filed January 17, 1914. Serial No. 812,842.

*To all whom it may concern:*

Be it known that I, EPHRAIM C. SOOY, a citizen of the United States of America, residing at Kansas City, in the county of Jackson and State of Missouri, have invented certain new and useful Improvements in the Systems and Apparatus for the Drainage and Reclamation of Inundated Surfaces of Land; and I do hereby declare that the following is a full, clear, and exact description of the invention, reference being had to the accompanying drawings, forming a part of this specification.

In the ordinary system of draining areas of land surfaces subject to inundation, and in reclaiming land which is more or less inundated, the water carries invariably the sedimentation or impurities, such as arise from the dissolution of soils, and commonly from clay soils, the substances naturally coating the walls of the drains and the filtering material, to such an extent as in time to destroy their usefulness. It is even difficult, in the ordinary underground water filtration, to disseminate the water so as to create a water head of sufficient volume to force itself hydraulically through the adjacent material or bed, such as quicksand and other like formations, and when the orifices between the filtering material are closed by the deposits from the solutions, it is impossible to remove bodies of water supplied to the drains. Furthermore, filtering drains now in common use are supplied with the materials indiscriminately aggregated, and the water is of necessity obliged to force its way through the orifices which afford the least resistance.

In the following described system and apparatus, which as illustrated applies to the drainage of land (although applicable to water filtering systems generally), has for its adaptation the drainage of such inundated surfaces to a requisite depth below the surface of the ground where a tight sub-strata is encountered, and in which the water, relieved of the impurities above described, will distribute itself and permit of the cultivation or other uses of the land. The invention is particularly adapted to such inundated land as has no natural drainage of the water as is found in sections of the country where the ground is level for long distances, and ordinary surface drainage if not impossible is of great expense, and particularly where the ground is dished, and underground drainage is necessary.

The preferred form of apparatus whereby the object of my invention is attained, is shown in the accompanying drawings, in which like characters of reference indicate like parts, and in which:—

Figure 1. shows the water filtering basin or head, at the surface of the ground and the granular or gravel bed below the surface, and in the porous stratum, and the conductor for conducting the filtered water to the surrounding artificial layers of filtering material. Fig. 2. shows the filtering basin at the surface of the ground, in plan view, and the by-passes and weir and percolators, and filtering bed for the arresting of sedimentary deposits in the water. Fig. 3 shows the water filtering bed in the head or basin, and the water conductor in cross section on the lines $x$, $x$, on Fig. 2, in which the view is looking toward the inner by-pass for the incoming water to the filtering bed. Fig. 4. shows the excavation or well in the stratum below the surface of the ground and the molds or forms in place, and also the water conductor in vertical section and in readiness for the first step of laying the materials to form the artificial filtering bed in layers of coarse and fine filtering material. Fig. 5. is a like view, showing the molds being withdrawn, from the formed layers, showing the layers of coarse and fine filtering material. Fig. 6. is a cross section of the view, as seen in Fig. 5, showing the mold plates as they are centered in respect to each other, and spaced apart for the molding of the bodies of the coarse and fine filtering material. Fig. 7. shows the screen on the circumferential lower portion of the water conductor.

In the application of the invention to large areas of overflowed ground, it is found desirable to open up the roads upon the section lines and at the junction of cross roads make one or more installations in the ditches upon either side of the road or wherever necessary. In such places an excavation or long ditch 10 is first made, as seen in Fig. 1, running longitudinally the requisite distance in the wet ground, and at a distance approximately two feet beneath the surface 12, of the ground, and about the same distance in width. The excavation thus formed is in the form of a long box, the sides 13 and the inner end 14, being in vertical lines, and the approach at the forward end 15 cut away about half the distance downwardly from the line of the upper surface to the line on the lower surface of an incline 15, which has a water carrying or downward grade to the said forward end of the excavation. At the inner end of the excavation 10, and a short distance from the end 14, the ground as seen in dotted lines is excavated in a downward direction, forming a well 16, which as shown is circular in form, the well being extended so far as to reach a parallel stratum of soil, which is conducive to saturation, and this is found at various depths below the surface, such as quick sand or similar porous material, which are found to be natural conductors of water, and the saturation of this stratum serves as a medium for carrying away large bodies of water, which upon the surface of the ground penetrates only to a sub-soil of clay, hard pan, gumbo or other non-filtering material. In excavating the ground to form a well 16, a casing 17 is employed to hold the quick sand in place or from caving in, which consists of a cylindrical body preferably composed of metal plate or other suitable material, the body being made in horizontal sectional parts, and the sections united one to the other. These sections are forced down the well as the well is being excavated, the sections being added one after another until the desired depth is reached and a pocket formed, in the bottom of which well or pocket a bed of gravel is first placed, as seen in Fig. 1. A water-conducting pipe 20, of the length necessary to extend from the line of the bottom of the excavation 10 to the line of the bottom of the well 16 is then placed within the well, at a point equi-distant from the inner surface of the form or cylinder 17, with its lower end upon the gravel bed, with the pipe in a vertical position, as seen in Figs. 4 and 5. Perforations $20^x$ are made in the lower end portion of the pipe 20, from the central portion downwardly, these perforations being large enough to permit of the free passage of the water. Around the perforated end of the pipe 20 is extended a wire screen 21, as seen in Fig. 7, which prevents by means of a fine mesh the entrance of small stones or other coarse material.

Molds or forms 23 and 24, for forming the layers of coarse and fine water percolating material are composed of concentric cylindrical plates spaced apart and short in length and connected together by spacing bars $24^x$, said mold plates being placed over the upper end of the pipe 20 and lowered in position to the bottom of the well 16 by the ropes 25, secured thereto, the inner mold plate 23 having guiding rods $24^c$, which loosely contact with the surface of pipe 20, and keep the inner surface of the inner mold plate the same distance concentrically from pipe 20. The space between the mold plate 23 and the pipe 20 is then filled with coarse filtering material 27, such as broken rock. The space between the mold plates 23 and 24 is filled with a filtering material of rock, crushed finer than the material 27. The space between the mold plate 24 and the cylindrical body 17, is filled with a filtering material 29, which may consist of coarse sand. The space now being filled in the mold plates, they are drawn upwardly by the ropes 24, just above the height of the ground or bed, and the mold plates again filled and again raised in position repeatedly, until the height of the porous body is reached, as seen in Fig. 5, when the said mold plates are removed from the well 16, thereby forming separate upright concentric bodies of filtering material varying in porosity, through which the water may pass unimpeded. The cylindrical body or casing 17 is then withdrawn from the well by means of the rope or chain 18, by the aid of sufficient power available for the purpose, and the well filled up to the bottom of the excavation 10, the upper end of the water conducting pipe 20 extending upwardly a short distance above the line of the bottom of the excavation 10. In the said excavation 10, and upon the bottom, which may be level, is placed a layer of concrete, preferably cement concrete 30, of suitable thickness and extending around the outer surface and upper end of the pipe 20. Upon the sides 13 and inner end 14 of the excavation 10, are spread layers of cement concrete, which form walls 31 and 32, respectively, and wall 33, which is also cement concrete, at the forward end of the excavation extending upwardly to the line of the surface of the ditch 15, the other walls extending upwardly to the line of the surface of the ground, and forms a water basin or reservoir. A bench 34 extending a short distance in height and being integral with the bottom, is located a short distance forwardly of the upper end of the pipe 20. Supported by the shoulders 35 and 34, on the bench 34, and the inner end portion of end wall 32, respectively, are transverse rods $36^x$, which support a coarse filtering screen 36.

Upon the upper surface of the screen 36 are laid horizontal layers of suitable coarse or fine filtering material 37, such as sand and gravel. A transverse partition 38, adjacent the forward end of the basin or head, extends downwardly to within a short distance of the bottom 30, of said basin. Upon said bottom 30 is a transverse, vertical partition or weir 39, which extends upwardly a short distance therefrom and is located a short distance in rear of a vertical line extending through the partition 38. A partition 40, which is similar to the partition 38, extends transversely to the basin in rear of a vertical line passing through the partition 39. This latter partition extends downwardly a like distance to the partition 38, and upon its rear surface and lower end supports the forward portion of a strainer or screen 41 preferably composed of a fabric such as cloth, the rear portion of the screen being secured to the upper portion of the bench 34.

The flow of the water from the end of the ditch 15, into the water holding basin is first diverted downwardly by the partition 38, and in passing over the partition 39 a part of the heavy sediment carried by the water is deposited. The water which now passes through the screen 41 is further removed of much of the slime and clay constituents in solution, which being intercepted by the meshes of the cloth form deposits upon the lower surface of the cloth, from which any accumulation may be removed by slight blows applied to the upper surface of the cloth or which may flake off by gravity. The water, relieved of such suspended impurities, now passes to the filtering bed 37, and in passing through the filtering material the water is purified, and thence flows into the pipe 20, and thence through its perforated and screened portion to the graded coarse body of the material 27, and thence through the bodies of less size 28 and 29, rapidly forming a distributing body of water, which now forces itself within the surrounding water-absorbing porous material or artificial gravel bed, the pressure of a continuously flowing body of water from the ditch into the river or basin acting within the basin hydraulically upon the body of water, which now fills the interstices of the gravel bed, and which causes greater absorption within the quick sand or other material, which is utilized to form the conductor or absorbent for efficient surface drainage.

The artificial gravel bed is as seen capable of being augmented, to afford a large capacity for taking the water, the area of the pocket being increased to the desired extent, so that a body of water conducted to the bed is quickly absorbed by the quicksand.

My invention affords an efficient disposition of the water in bogs, or in a morass, a flowing of the surface water as soon as the artificial gravel bed is obtained following the large absorption by the bed, as its capacity for distribution is increased.

I am aware that tile drains have been sunk in the ground to the depth required, but no previous attempt has been made prior to my invention to systematically create a water head in the tight under-ground material which is encountered in practical land drainage whereby the gradual enlargement of the water head will force the water hydraulically through the adjacent material as before stated. In my invention the separate bodies of water percolating material varying in porosity is the unique feature not hitherto anticipated by other inventions in under-ground drainage. Furthermore my construction of the porous bodies around the drain pipe wherein a selection is made of the materials is distinctively new in the state of the art.

Having fully described my invention, what I now claim as new and desire to secure by Letters Patent is:

1. In under-ground drains, the combination with a pocket therein, of an artificial water percolating bed within said pocket composed of separate graduated bodies of water percolating material one within the other and varying in porosity, and a conductor of water leading to said artificial bed.

2. In under-ground drains, the combination with a pocket therein, of an artificial water percolating bed within said pocket composed of separate contiguous upright bodies of water percolating material, one within another and varying in porosity, and a conductor of water having perforations in its lower end portion leading within the innermost percolating body.

3. In under-ground drains the combination with a drain pipe, a drainage area of water absorbing material beneath the surface of the ground, and an artificial filtering bed composed of concentric bodies of water filtering material in said area varying in porosity and a water conducting pipe having perforations in its lower end extending within the said filtering bed, and a basin at the surface of the ground into which the upper end of said pipe extends.

EPHRAIM C. SOOY.

Witnesses:
ROBERT O. McLIN,
ANNIE L. GREER.